US012782785B2

(12) United States Patent
Minikey, Jr. et al.

(10) Patent No.: US 12,782,785 B2
(45) Date of Patent: Nov. 3, 2026

(54) CONNECTION METHODS FOR ELECTRO-OPTIC DEVICE

(71) Applicant: Gentex Corporation, Zeeland, MI (US)

(72) Inventors: Danny L. Minikey, Jr., Fenwick, MI (US); Adam R. Heintzelman, Grand Rapids, MI (US); David J. Cammenga, Holland, MI (US); Mario F. Saenger Nayver, Holland, MI (US); Autumn W. Goulet, Caledonia, MI (US); Patrick Kelly Kreun, Zeeland, MI (US); Ridge A. DeJong, Wyoming, MI (US); Joel A. Stray, Grand Haven, MI (US); Gary J. Dozeman, Zeeland, MI (US); Christopher M. Derry, Allegan, MI (US)

(73) Assignee: GENTEX CORPORATION, Zeeland, MI (US)

( * ) Notice: Subject to any disclaimer, the term of this patent is extended or adjusted under 35 U.S.C. 154(b) by 262 days.

(21) Appl. No.: 18/444,939

(22) Filed: Feb. 19, 2024

(65) Prior Publication Data

US 2024/0280874 A1 Aug. 22, 2024

Related U.S. Application Data

(60) Provisional application No. 63/485,988, filed on Feb. 20, 2023.

(51) Int. Cl.

*G02F 1/153* (2006.01)
*G02F 1/155* (2006.01)
*G02F 1/161* (2006.01)

(52) U.S. Cl.

CPC ............ *G02F 1/1533* (2013.01); *G02F 1/155* (2013.01); *G02F 1/161* (2013.01)

(58) Field of Classification Search

CPC ........ G02F 1/1533; G02F 1/155; G02F 1/161; G02F 1/1339; G02F 1/1345

(Continued)

(56) References Cited

U.S. PATENT DOCUMENTS 7,324,261 B2 * 1/2008 Tonar .................... G02F 1/1503 359/267
9,539,883 B2 1/2017 Snider et al.

(Continued)

FOREIGN PATENT DOCUMENTS

EP 3190459 A1 7/2017
KR 20180064488 A 6/2018

(Continued)

*Primary Examiner* — Tuyen Tra

(74) *Attorney, Agent, or Firm* — Price Heneveld LLP; Brian James Brewer

(57) ABSTRACT

An electro-optic assembly includes a front substrate that has a first surface and a second surface opposite the first surface. A second substrate has a third surface and a fourth surface opposite the third surface. The second and third surfaces face each other to define a gap with a cell spacing. A first electrode is coupled to the second surface, and a second electrode is coupled to the third surface. An electro-optic medium is located between the first electrode and the second electrode. A conductor assembly is electrically coupled to the first electrode and defines at least one space containing a first conductive intermediary. A seal retains the electro-optic medium in the gap.

20 Claims, 17 Drawing Sheets

(58) Field of Classification Search
USPC .......................................................... 359/265
See application file for complete search history.

(56) References Cited

U.S. PATENT DOCUMENTS

| | | | | |
|---|---|---|---|---|
| 2013/0076231 | A1 | 3/2013 | Nakanishi et al. | |
| 2020/0016963 | A1 | 1/2020 | Bomers | |
| 2020/0183244 | A1 * | 6/2020 | DeNolf | E06B 9/24 |
| 2021/0080792 | A1 | 3/2021 | Heintzelman et al. | |
| 2022/0349246 | A1 | 11/2022 | Junge et al. | |

FOREIGN PATENT DOCUMENTS

| | | | |
|---|---|---|---|
| KR | 101961428 | B1 | 3/2019 |
| WO | 2006050366 | A2 | 5/2006 |
| WO | 2006050366 | A3 | 5/2006 |

* cited by examiner

CONNECTION METHODS FOR ELECTRO-OPTIC DEVICE

CROSS-REFERENCE TO RELATED APPLICATION

This application claims priority to and the benefit under 35 U.S.C. § 119(e) of U.S. Provisional Application No. 63/485,988, filed on Feb. 20, 2023, entitled "CONNECTION METHODS FOR ELECTRO-OPTIC DEVICE," the disclosure of which is hereby incorporated herein by reference in its entirety.

FIELD OF THE DISCLOSURE

The present disclosure generally relates to an electro-optic device, and, more particularly, to an electro-optic device with a conductor assembly and a connection system that electrically couples the conductor assembly to the electro-optic device.

SUMMARY OF THE DISCLOSURE

According to one aspect of the present disclosure, an electro-optic assembly includes a front substrate that has a first surface and a second surface opposite the first surface. A second substrate has a third surface and a fourth surface opposite the third surface. The second and third surfaces face each other to define a gap with a cell spacing. A first electrode is coupled to the second surface, and a second electrode is coupled to the third surface. An electro-optic medium is located between the first electrode and the second electrode. A conductor assembly is electrically coupled to the first electrode and defines at least one space containing a first conductive intermediary. A seal retains the electro-optic medium in the gap.

According to another aspect of the present disclosure, an electro-optic assembly includes a front substrate that has a first surface and a second surface opposite the first surface. A second substrate has a third surface and a fourth surface opposite the third surface. The second and third surfaces face each other to define a gap with a cell spacing. A first electrode is coupled to the second surface, and a second electrode is coupled to the third surface. At least one of the first and second electrodes includes at least one isolation line defining at least one conductive island. An electro-optic medium is located between the first electrode and the second electrode and configured to activate between transmission states. A conductor assembly is electrically coupled to the first electrode and the second electrode and includes at least one conductive bridge that electrically couples the at least one conductive island to the first and second electrodes opposite the at least one of the first and second electrodes that includes the at least one isolation line.

According to yet another aspect of the present disclosure, an electro-optic assembly includes a front substrate that has a first surface and a second surface opposite the first surface. A second substrate has a third surface and a fourth surface opposite the third surface. The second and third surfaces face each other to define a gap with a cell spacing. A first electrode is coupled to the second surface, and a second electrode is coupled to the third surface. An electro-optic medium is located between the first electrode and the second electrode. A conductor assembly includes a first conduction path that is adhered to one of the first electrodes with a first conductive intermediary and a second conduction path that is coupled to the other of the first and second electrodes with a second conductive intermediary. A seal retains the electro-optic medium in the gap.

These and other features, advantages, and objects of the present disclosure will be further understood and appreciated by those skilled in the art by reference to the following specification, claims, and appended drawings.

DETAILED DESCRIPTION

Figure 1:
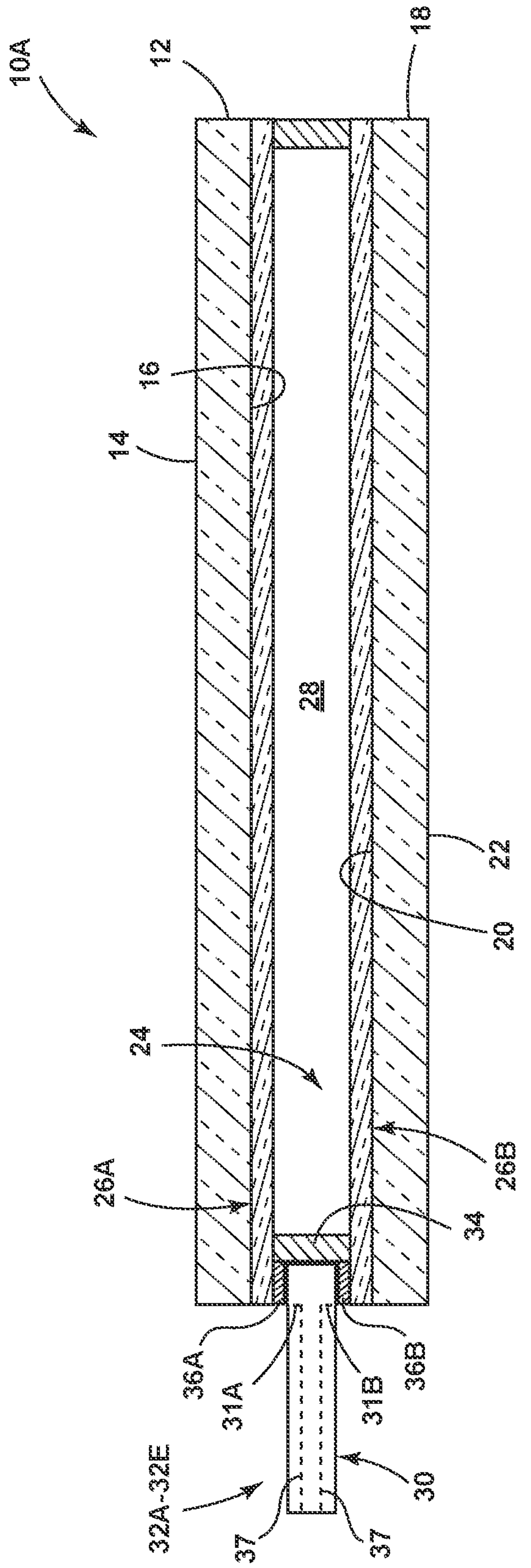
FIG. 1 is a cross-sectional view of an electro-optic device of a first construction in accordance with the present disclosure.

The present illustrated embodiments reside primarily in combinations of method steps and apparatus components related to an electro-optic device with a conductor assembly and a connection system that electrically couples the conductor assembly to the electro-optic device. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1, 3A-4D, reference numeral 10A generally designates an electro-optic assembly of a first construction. The electro-optic assembly 10A includes a first substrate 12 that has a first surface 14 and a second surface 16 opposite the first surface 14. A second substrate 18 has a third surface 20 and a fourth surface 22 opposite the third surface 20, the second and third surfaces 16, 20 face each other to define a gap 24 with a cell spacing. A first electrode 26A is coupled to the second surface 16, and a second electrode 26B is coupled to the third surface 20. An electro-optic medium 28 is located between the first electrode 26A and the second electrode 26B. A conductor assembly 30 is electrically coupled to the first electrode 26A and the second electrode 26B and defines at least one space 46 containing a first conductive intermediary 48. A seal retaining the electro-optic medium 28 in the gap 24.

With reference now to FIGS. 1-9, the conductor assembly 30 illustrated in FIGS. 1, 4A-4D is a component of a first connection system 32A. However, as will be appreciated with further reading, the conductor assembly 30 may be a component of a second connection system 32B (FIGS. 5A-5B), a third connection system 32C (FIGS. 6A-6D), a fourth connection system 32D (FIGS. 7A-7D), a fifth connection system 32E (FIGS. 8A-8B), and/or combinations thereof. Generally speaking, the connection systems 32A-32E described herein are not reliant on cell spacing (i.e., the depth of the gap 24), internal force from the substrates 12, 18 (e.g., via sandwiching), and provide for improvements to uniformity as the conductor assembly 30 does not interfere with (e.g., via outward biasing force) the cell spacing.

With reference now to FIG. 1, the first and second substrates 12, 18 may be formed of a plastic material that is flexible or, alternatively, a glass and/or ceramic material. For example, the plastic material may be selected from a group consisting of a variety of different polymers. The electro-optic medium 28 may be retained within the gap 24 via a seal 34 that extends along a perimeter of the electro-optic assembly 10A. The electro-optic medium 28 may be configured one the basis of liquid crystal technology or utilize at least one anode and one cathode suspended in the electro-optic medium and/or electrodes 26A, 26B. A first electrical bus 36A may be electrically coupled to the first electrode 26A and the conductor assembly 30 and a second electrical bus 36B may be electrically coupled to the second electrode 26B and the conductor assembly 30. More particularly, the electrical buses 36A, 36B may provide current to the electrodes 26A, 26B via the conductor assembly 30 (e.g., a flex conductor). In some embodiments, the conductor assembly 30 may connect to the first and second buses 36A, 36B directly or via a conductive intermediary. The conductor assembly 30 may be configured to receive electrical energy via a power source (not shown). While the electrical buses 36A, 36B are illustrated as being located on the same side of the electro-optic assembly 10A, it should be appreciated that the electrical buses 36A, 36B may be on different (e.g., opposite) sides. It is contemplated that, in some embodiments, the electrical buses 36A, 36B may not be utilized and, instead, the conductor assembly 30 may provide current to the electrodes 26A, 26B directly (e.g., through one or more conductive intermediaries). As depicted, the conductor assembly 30 may at least partially be located between the first and second substrates 12, 18.

Figure 2:
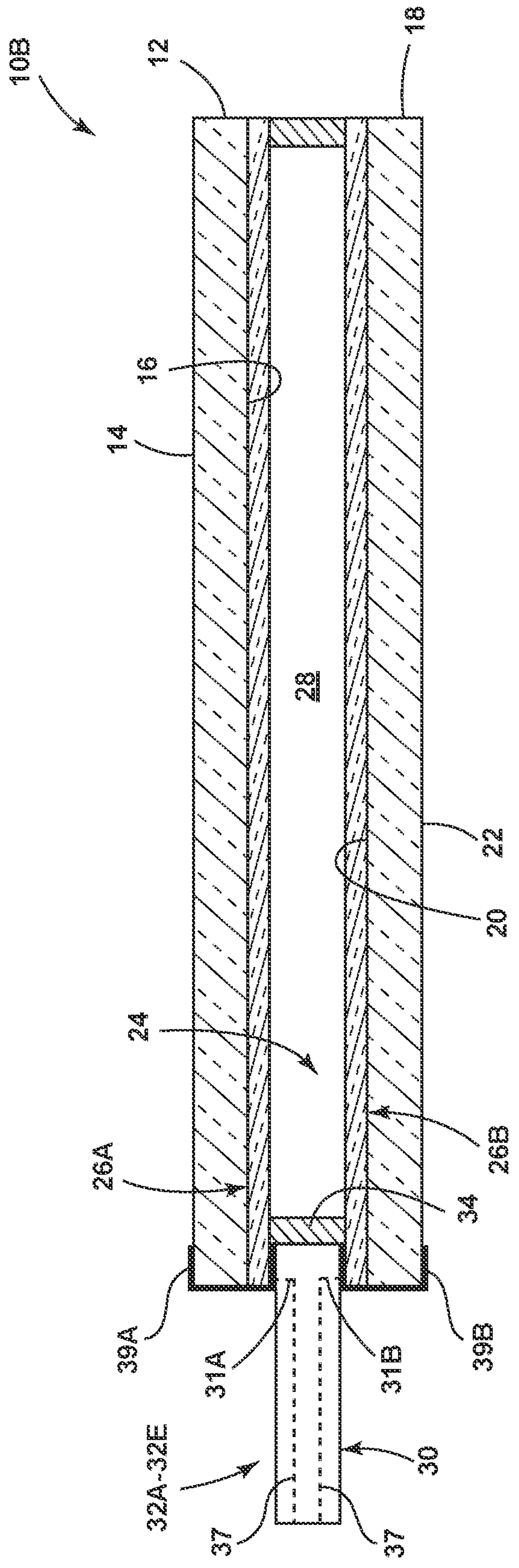
FIG. 2 is a cross-sectional view of an electro-optic device of a second construction in accordance with the present disclosure.

With reference now to FIG. 2, an electro-optic assembly 10B of a second construction is illustrated. Unless otherwise indicated, the second construction may share all of the same features, dimensions, materials, and components of the first construction. However, the electro-optic assembly does not include the first and second buses 36A, 36B and, rather, the electrodes 26A, 26B are electrically coupled to the conductor assembly 30 directly (e.g., via one or more conductive intermediaries) or via a conductive intermediary other than the first and second buses 36A, 36B. For example, it is contemplated that a conductive wrap 39A, 39B may extend over an edge of the electrodes 26A, 26B and substrates 12, 18 (i.e., peripheral edges) to permit the conductor assembly 30 to be electrically coupled along a peripheral edge of the electrodes 26A, 26B. In some embodiments, the conductive wrap 39A, 39B may include a first conductive wrap 39A that extends over a portion of the first surface 14, the second surface 16, or both the first and second surfaces 14, 16. The first conductive wrap 39A may further extend along peripheral edges of the first substrate 12 and first electrode 26A. In some embodiments, the first conductive wrap 39A may extend over a portion of the second surface 16 such that a portion of the first conductive wrap 39A is located between the first electrode 26A and the second surface 16. In other embodiments, the first electrode 26A may be located between a portion of the first conductive wrap 39A and the second surface 16 (e.g., sandwiched therebetween). The conductive wrap 39A, 39B may further include a second conductive wrap 39B that is coupled to the second substrate 18 and second electrode 26B in the same manner the first conductive wrap 39A is coupled to the first substrate 12 and the first electrode 26A. While the conductive wraps 39A, 39B are illustrated as being located on the same side of the electro-optic assembly 10B, it should be appreciated that the conductive wraps 39A, 39B may be on different (e.g., opposite) sides. Similar to FIG. 1, the electro-optic medium 28 may be configured one the basis of liquid crystal technology or utilize at least one anode and one cathode suspended in the electro-optic medium and/or electrodes 26A, 26B.

With continued reference to FIG. 2, the conductor assembly 30 may be singular (electrically coupled to both of the electrodes 26A, 26B), multiple (e.g., a first conductor assembly 30 electrically coupled to the first electrode 26A and a second conductor assembly 30 electrically coupled to the second electrode 26B), or branched (e.g., a conductor assembly 30 with a first branch electrically coupled to the first electrode 26A and a second branch electrically coupled to the second electrode 26B). The conductor assembly 30 may further include a first conduction port 31A that provides power to the first electrode 26A and a second conduction port 31B that provides power to the second electrode 26B. As used herein, "conduction port" refers to a portion of the conductor assembly 30 that transmits electrical energy to the electrodes 26A, 26B and/or any intermediary structures between the conductor assembly 30 and electrodes 26A, 26B. In some embodiments, each conduction port 31A, 31B may be electrically coupled to a discrete branch (e.g., conduction path 37) within the conductor assembly 30. In this manner, the conduction assembly 30 (e.g., a flex conductor) includes each conduction path 37 and each conduction path 37 can independently and selectively transmit electrical energy. The conduction ports 31A, 31B may be located on the singular conductor assembly 30, different branches, or different conductor assemblies 30 entirely. The conductor assembly 30 may be electrically coupled to the electrodes 26A, 26B (e.g., via the conductive wrap 39A, 39B in FIG. 2 or the bus 36A, 36B in FIG. 1) with a conductive intermediary, such as a conductive paste, epoxy, foam, tape, adhesive, ink, solder, combinations thereof, and/or the like. The conductive intermediary may be isotropic, anisotropic, curable, non-curable, exhibit high or low durometer characteristics pre- or post-curing. It should be appreciated that varieties of the conductor assembly 30, conduction ports 31A, 31B, and conductive intermediaries could be incorporated into the electro-optic assembly 10A of the first construction. As depicted, the conductor assembly 30 may at least partially be located between the first and second substrates 12, 18.

Figure 3A:
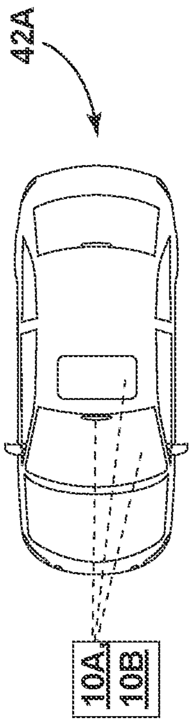
FIG. 3A is a top view of a vehicle incorporating an electro-optic assembly in accordance with the present disclosure.
Figure 3B:
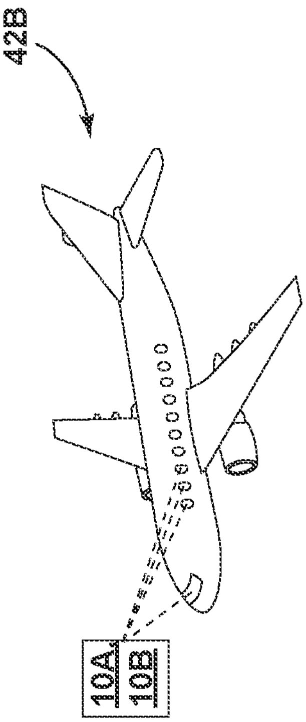
FIG. 3B is an upper perspective view of an aircraft incorporating an electro-optic assembly in accordance with the present disclosure.
Figure 3C:
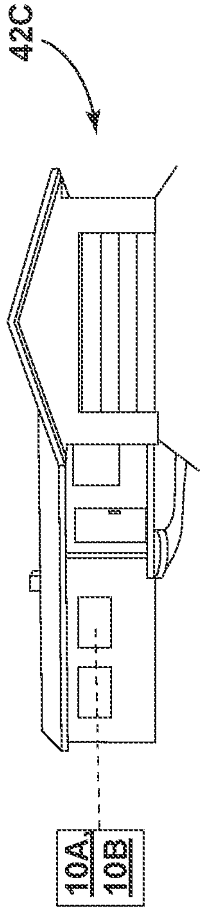
FIG. 3C is an elevational view of a building incorporating an electro-optic assembly in accordance with the present disclosure.
Figure 3D:
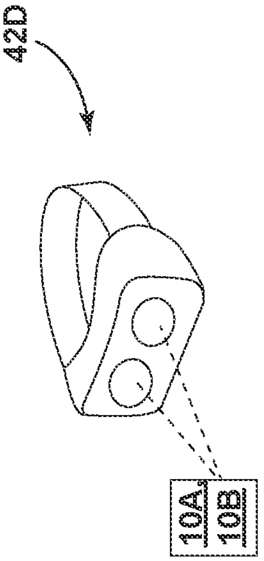
FIG. 3D is an upper perspective view of an eyewear assembly incorporating an electro-optic assembly in accordance with the present disclosure.

Referring to FIGS. 3A-3D, the electro-optic assembly 10A, 10B may be switchable between a substantially transmissive state and a substantially darkened state. In other embodiments, the electro-optic assembly 10A, 10B is configured as an electrochromic device that is switchable between a high reflectance state and a low reflectance, partially transmissive state. Various embodiments of electro-optic assembly 10A, 10B may be incorporated with one or more structures 42A-42D. FIG. 3A illustrates an automobile 42A employing the electro-optic assembly 10A, 10B, for example, with an interior rearview mirror, a sunroof, a windshield, a side window, a heads-up display, combinations thereof, and/or other interior vehicle locations. The automobile 42A may include a commercial vehicle, an emergency vehicle, a residential vehicle, or the like. FIG. 3B illustrates an aircraft 42B employing the electro-optic assembly 10A, 10B (e.g., a front window, side window, heads-up display). FIG. 3C illustrates a building 42C employing electro-optic assembly 10A, 10B (e.g., a window). The building 42C may be a residential building, a commercial building, and/or the like. FIG. 3D illustrates eyewear 42D employing electro-optic assembly 10A, 10B. For example, the eyewear may be glass with a dimming functionality, augmented reality, mixed reality, virtual reality, and/or the like. Generally speaking, the electro-optic assembly 10A, 10B may be incorporated into any environment where electrochromic effects are beneficial, such as changing the state of a window, mirror, display, and/or other structures and environments.

With reference to FIGS. 1-3D, the first substrate 12 (e.g., a distance between the first surface 14 and the second surface 16) and/or the second substrate 18 (e.g., a distance between the third surface 20 and the fourth surface 22) may both define a thickness. The thickness may be less than 1.0 mm, for example, less than 0.5 mm, less than 0.4 mm, less than 0.3 mm, less than 0.2 mm, between 0.5 mm and 0.4 mm, between 0.4 mm and 0.3 mm, or between 0.3 mm and 0.2 mm. The conductor assembly 30 may be configured as a variety of electrical conductor assemblies, for example, wires, flexible conductor assemblies (as depicted), or other types of electrical conductor assemblies that may include conduction portions and insulating portions (e.g., jackets, overcoats, and/or the like) for a variety of cell spacings and substrate 12, 18 thicknesses.

Figure 4A:
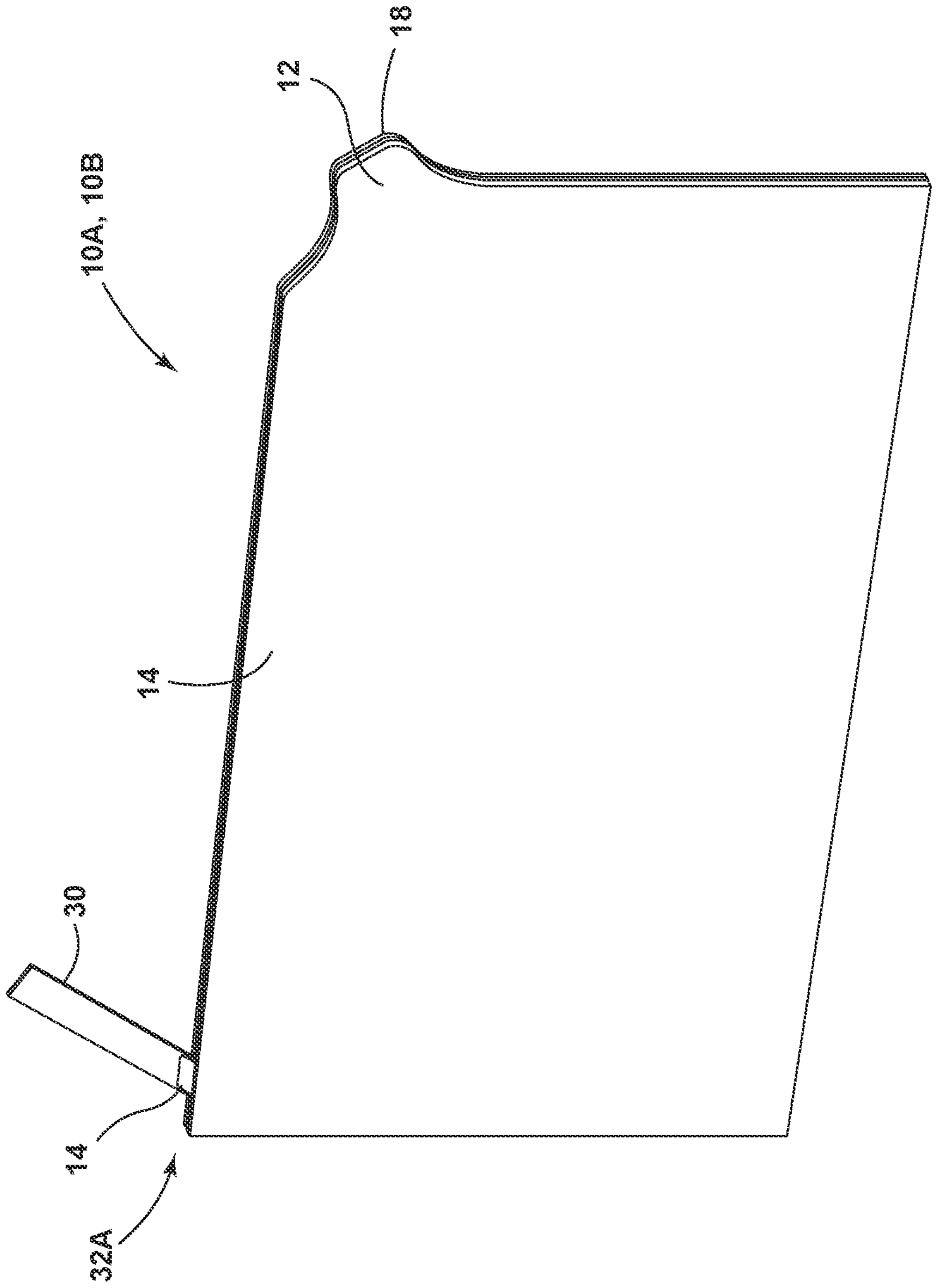
FIG. 4A is a front perspective view of an electro-optic device with a conductor assembly and a first connection system in accordance with the present disclosure.
Figure 4B:
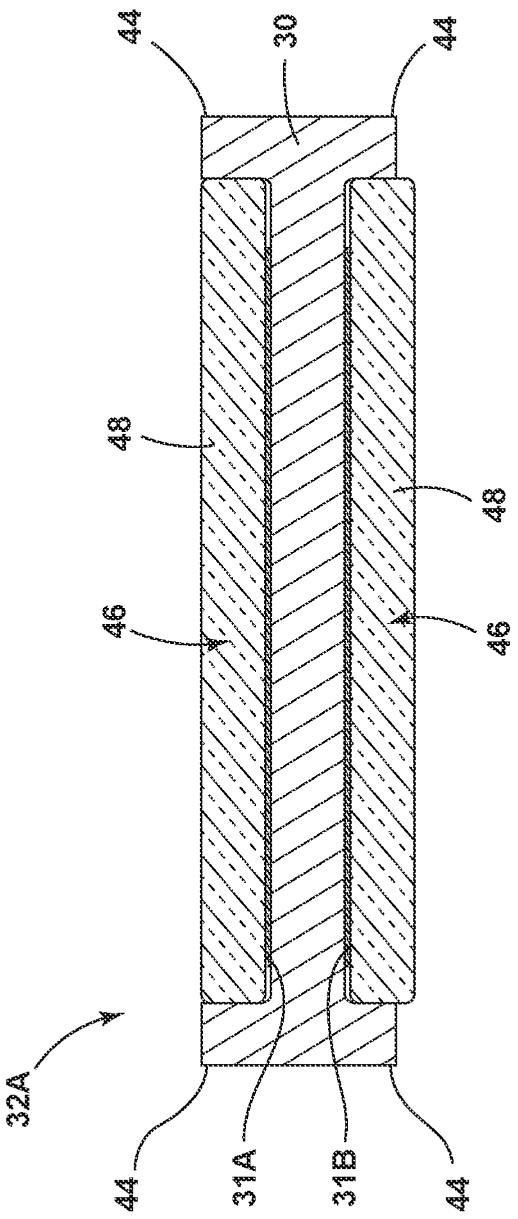
FIG. 4B is a cross-sectional view of a conductor assembly of a first connection system in accordance with the present disclosure.

With reference now to FIGS. 4A-4B, the first connection system 32A is illustrated. The first connection system 32A may be electrically coupled to the electro-optic assemblies 10A, 10B of either construction, incorporated into any of the structures 42A-42D, and utilize the variations of the conductor assembly 30 and conductive intermediaries as described above. Unless otherwise indicated, the first connection system 32A may share all of the same features, dimensions, materials, and components as the other connection systems 32B-32E. More particularly, the first connection system 32A includes the conductor assembly 30 and the conductor assembly 30 includes projections 44 (e.g., two pairs of opposing projections 44 as depicted in FIG. 4B) that define a pair of opposing spaces 46. The first conduction port 31A may be in one of the spaces 46, and the second conduction port 31B may be in the opposing space 46. A conductive intermediary 48, such as those described above, may be located within each of spaces 46 and in contact with each of the conduction ports 31A, 31B for providing electrical energy to the electrodes 26A, 26B. In this manner, the projections 44 center the conduction ports 31A, 31B from the electrodes 26A, 26B to provide a location for the conductive intermediary 48. During assembly, the conductor assembly 30 may be inserted after the seal 34 is installed, pre- or post-curing. As such, the conductor assembly 30 can be electrically coupled to the electrodes 26A, 26B in a variety of cell-spacing configurations. The projections 44 also function to facilitate insertion (e.g., via added rigidity), confine the conductive intermediary 48 within the respective opposing spaces 46, and electrically isolate the conduction ports 31A, 31B from one another. In some embodiments, the projections 44 and spaces 46 may only be located on a section of the conductor assembly 30 that is inserted between the substrates 12, 18.

Figure 4C:
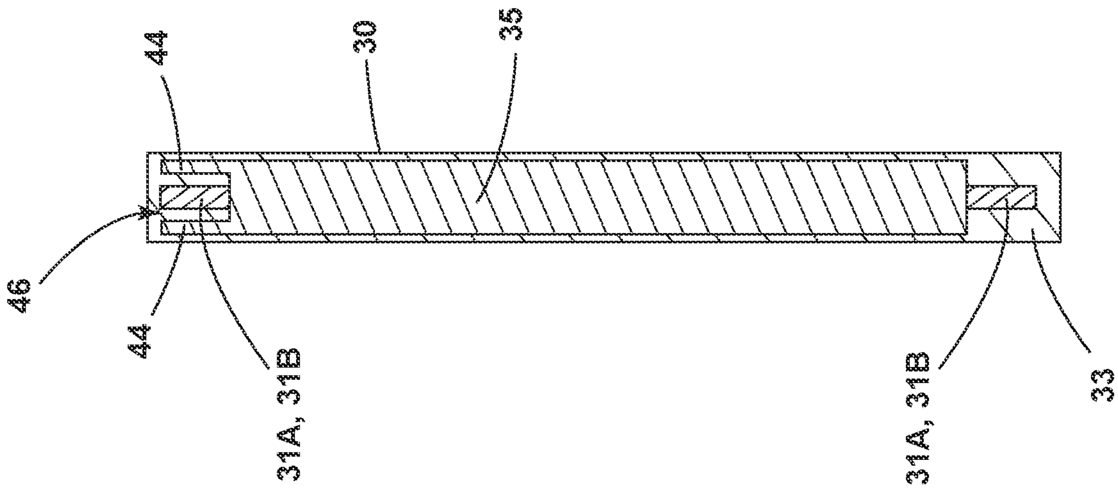
FIG. 4C is a top view of a conductor assembly of a first connection system in accordance with the present disclosure.
Figure 4D:
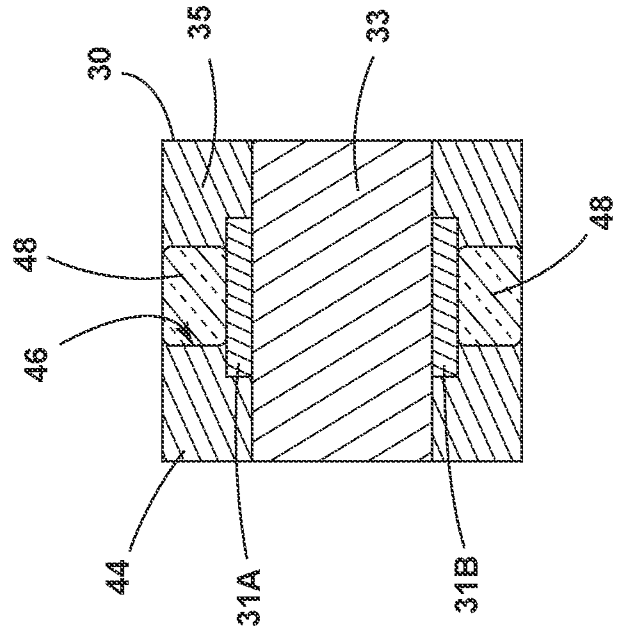
FIG. 4D is a cross-sectional view of a conductor assembly of a first connection system in accordance with the present disclosure.

With reference to FIGS. 4C and 4D, in some embodiments, the projections 44 may be formed as part of the overcoat layer 35. More particularly, the conductor assembly 30 and/or the conduction paths 37 may be substantially embedded or encased in the overcoat layer 35 but include openings that expose only the conduction ports 31, 31B. The overcoat 35 may define the projections 44 around the openings that expose the conduction ports 31A, 31B to retain the conductive intermediary 48 within the space 46. As best shown in FIG. 4D, the conductor assembly 30 may include a conductor assembly substrate 33 that connects to the conduction ports 31A, 31B and an overcoat layer 35 that is located over the conductor assembly substrate 33 and a portion of the conduction ports 31A, 31B and/or conduction paths 37 (FIGS. 4C and 4D).

With continued reference to FIGS. 4C and 4D, the overcoat layer 35 is depicted as forming the projections 44. However, it should be appreciated that other materials, structures, and components (e.g., formed of non-conducting material) may be used to form the projections 44. In addition, the projections 44 may be discrete from the overcoat layer 35 regardless of materials utilized. For example, the projections 44 may be shaped as ridges, ribs, posts, and/or other shapes that define spacing and expose the conduction ports 31A, 31B for holding the conductive intermediary 48. In some embodiments, a single projection 44 may be utilized. Similarly, the space 46 is defined between the projections 48 any may include a pocket, a channel, and/or other shapes. Further, while the conduction ports 31A, 31B and conduction paths 37 are illustrated as being on opposite sides of the conductor assembly 30 (e.g., on opposite sides of the conductor assembly substrate 33), it should be appreciated that both the conduction paths 37 and/or conduction ports 31A, 31B may be located on the same side of the conductor assembly substrate 33 and electrically isolated by the overcoat layer 35 and one or more of the projections 44. In some embodiments, the conduction ports 31A, 31B may be offset along a length of the conductor assembly substrate 33 to ensure isolation between the conduction paths 37.

Figure 5A:
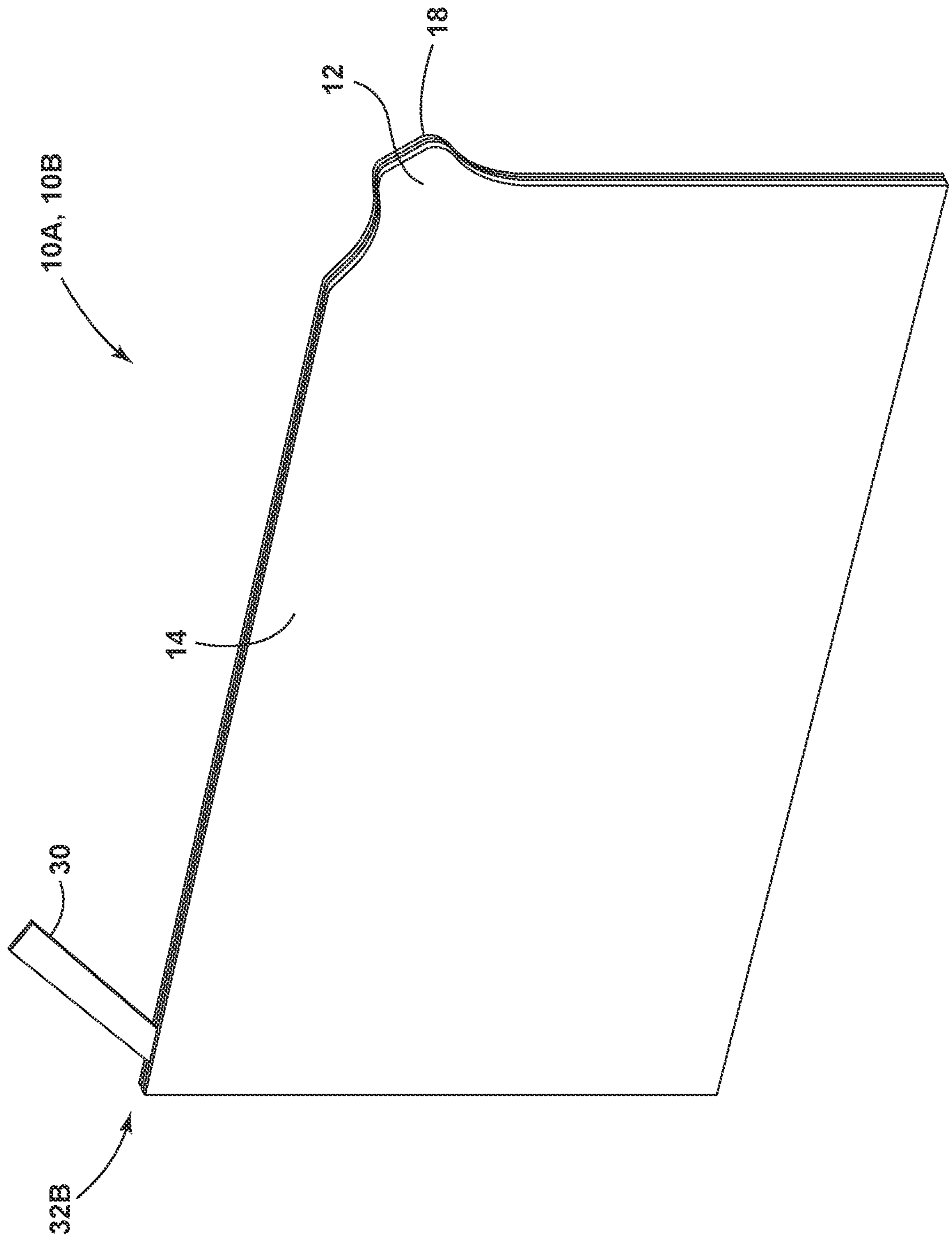
FIG. 5A is a front perspective view of an electro-optic device with a conductor assembly and a second connection system in accordance with the present disclosure.
Figure 5B:
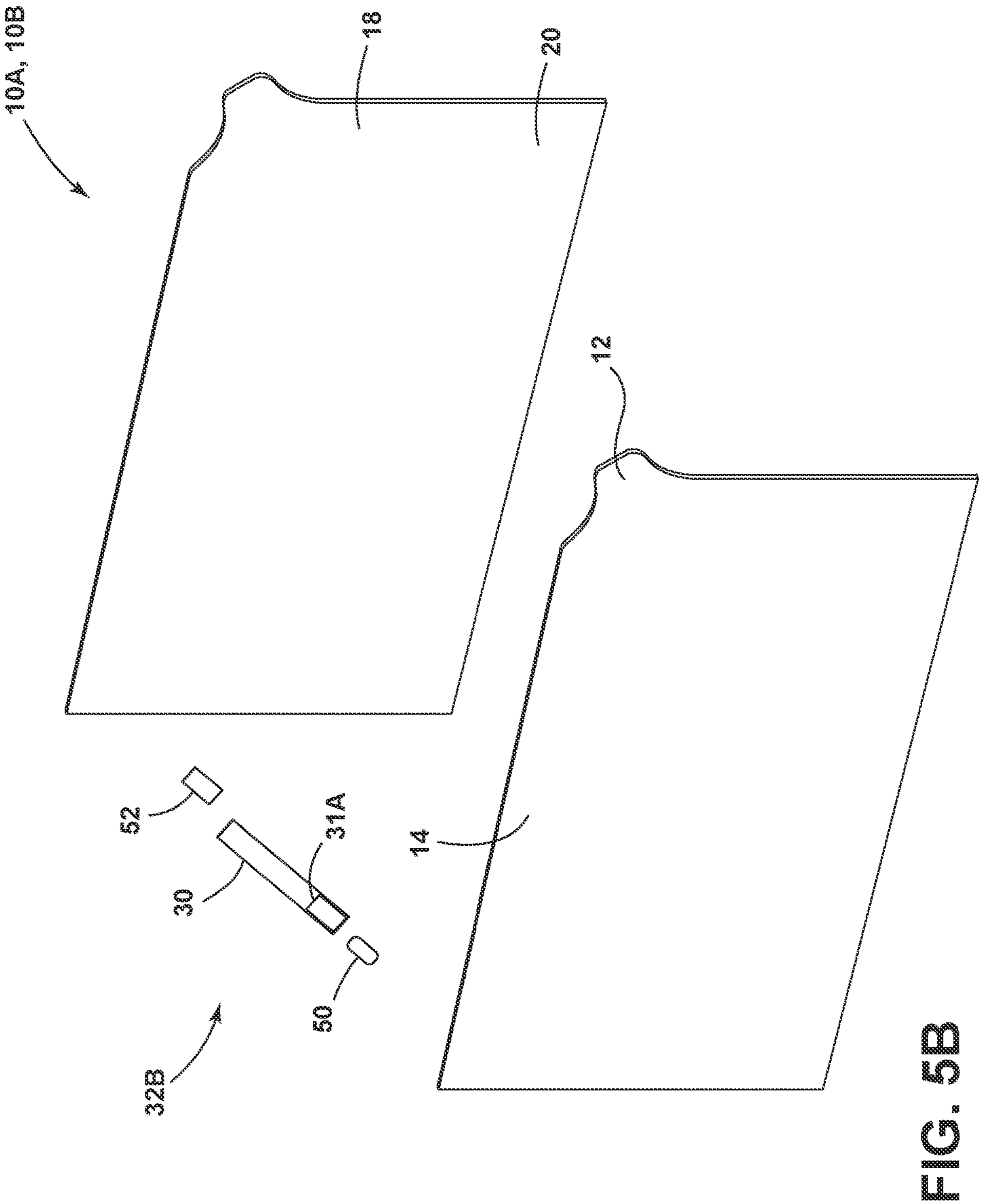
FIG. 5B is a front perspective view of an electro-optic device in a disassembled condition with a conductor assembly and a second connection system in accordance with the present disclosure.
Figure 6A:
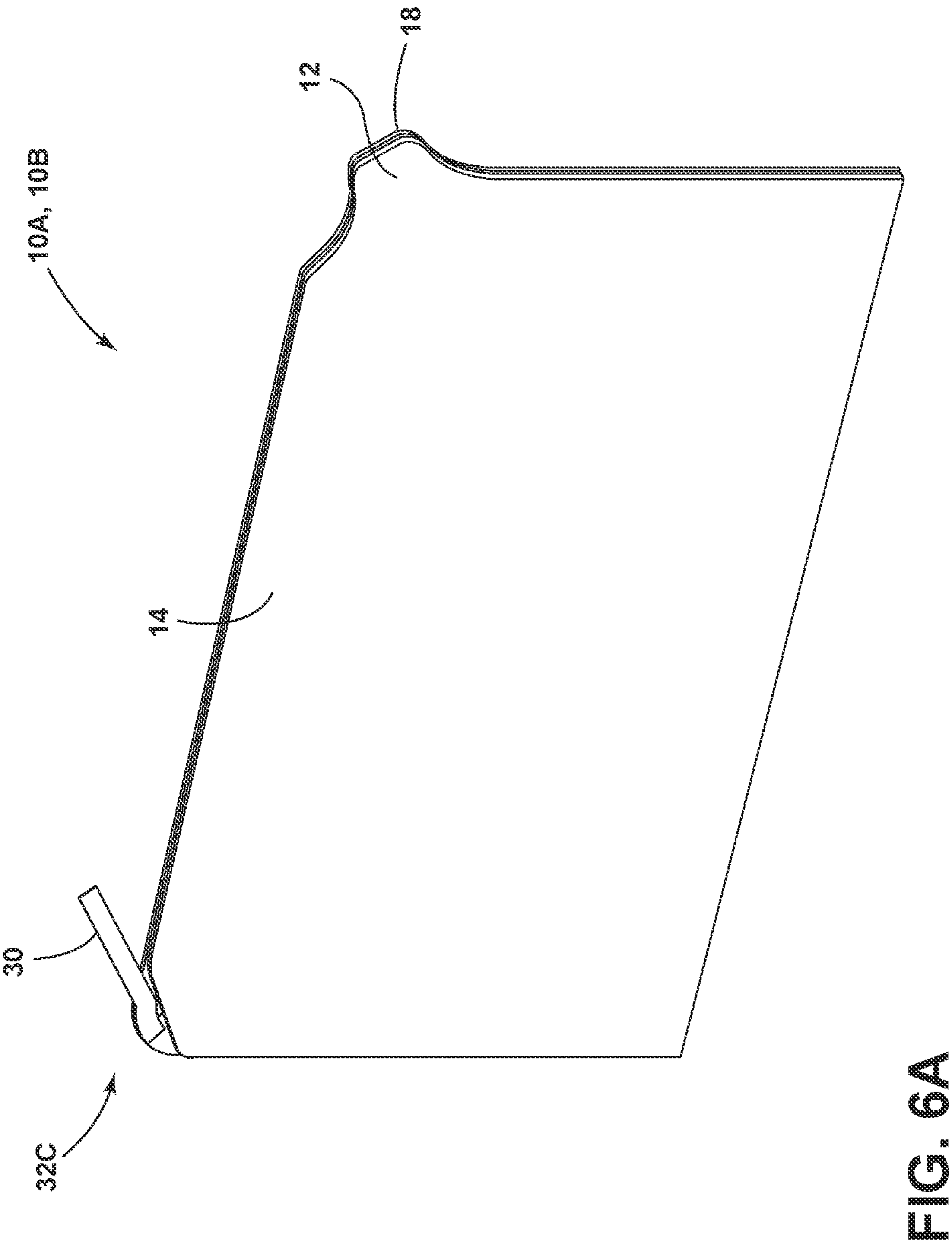
FIG. 6A is a front perspective view of an electro-optic device with a conductor assembly and a third connection system in accordance with the present disclosure.
Figure 6B:
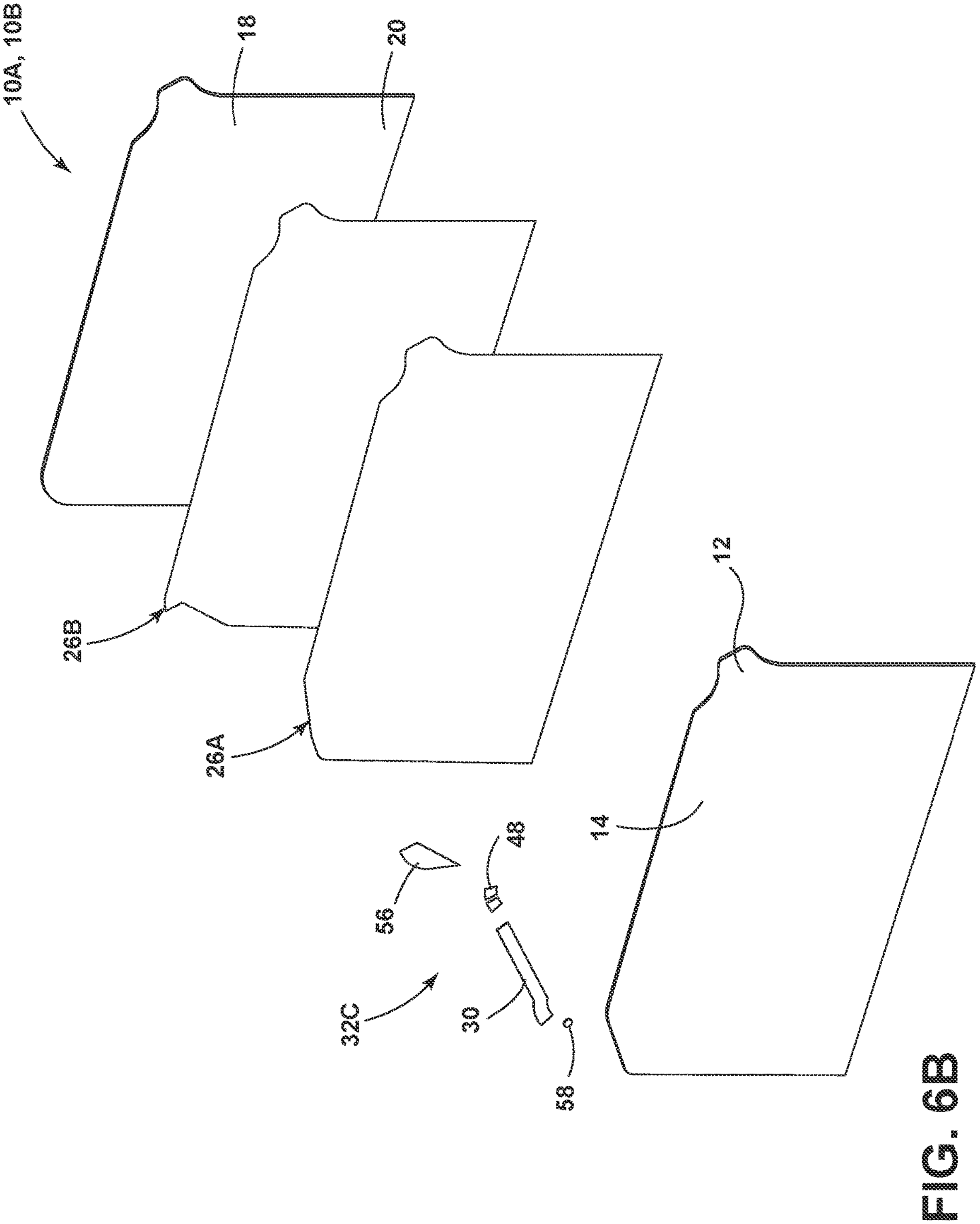
FIG. 6B is a front perspective view of an electro-optic device in a disassembled condition with a conductor assembly and a third connection system in accordance with the present disclosure.
Figure 6D:
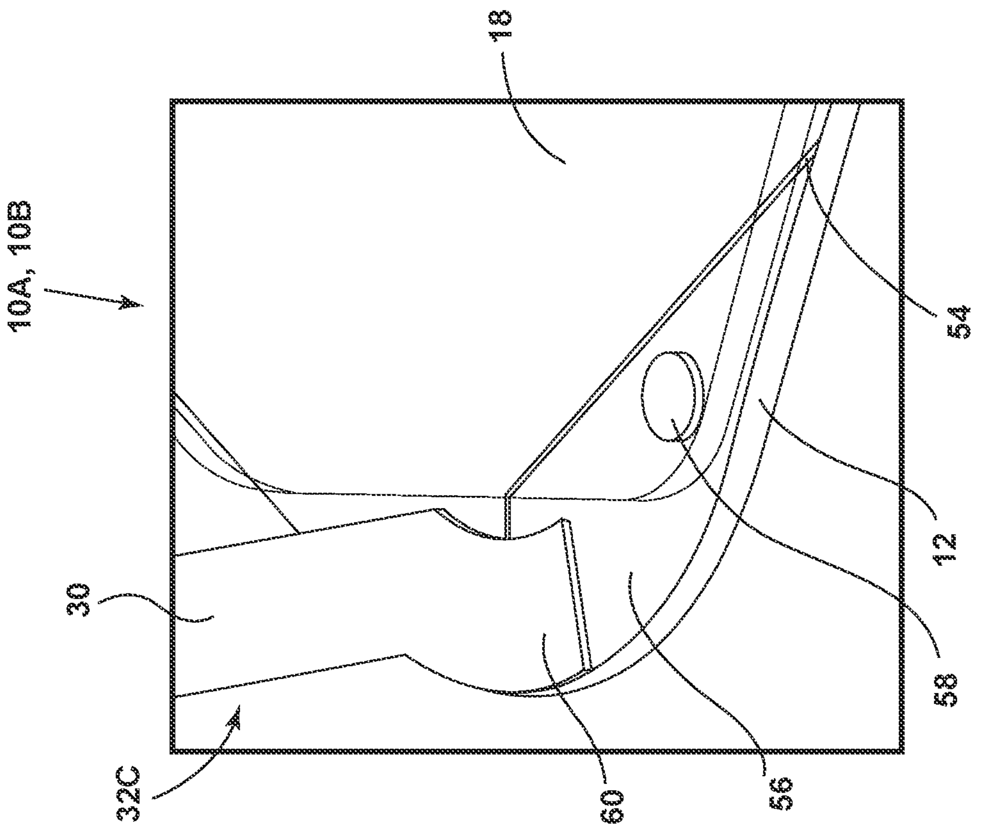
FIG. 6D is a perspective view of an electro-optic assembly and a third connection system in accordance with the present disclosure.
Figure 6C:
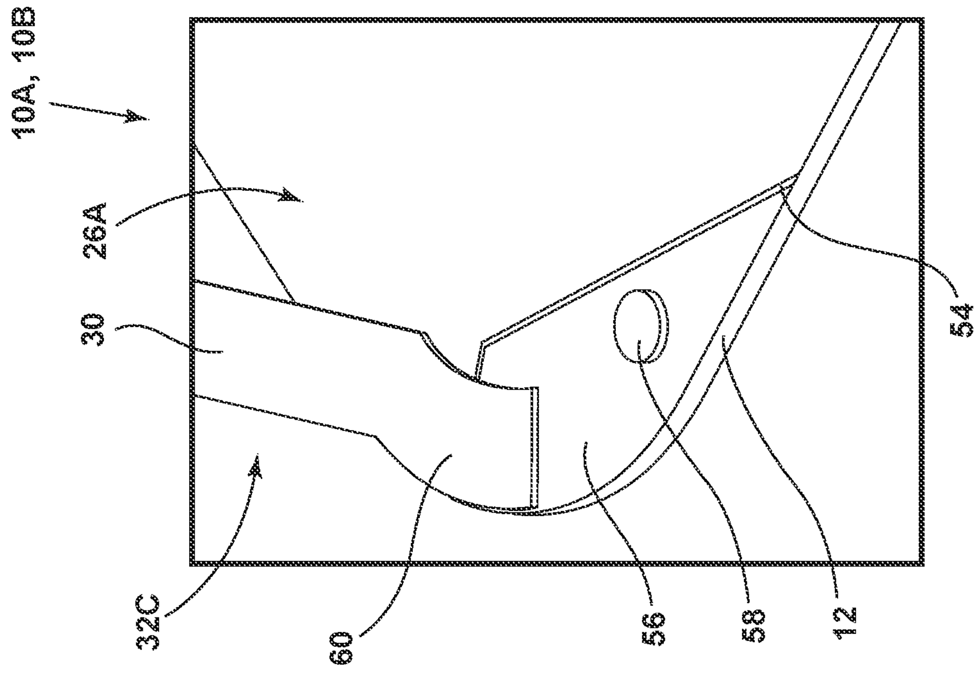
FIG. 6C is a perspective view of a partially disassembled electro-optic assembly and a third connection system in accordance with the present disclosure.
Figure 7A:
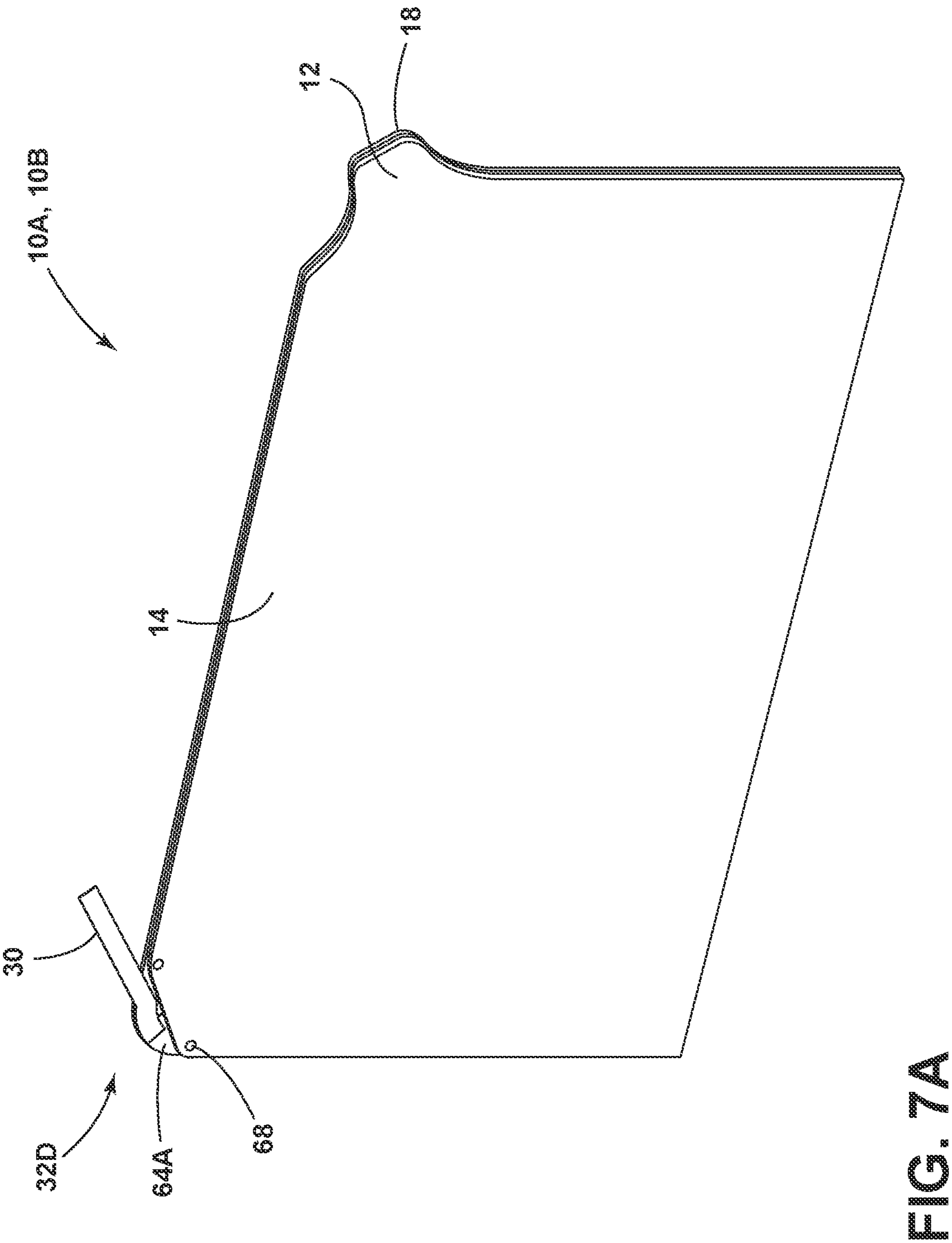
FIG. 7A is a front perspective view of an electro-optic device with a conductor assembly and a fourth connection system in accordance with the present disclosure.
Figure 7B:
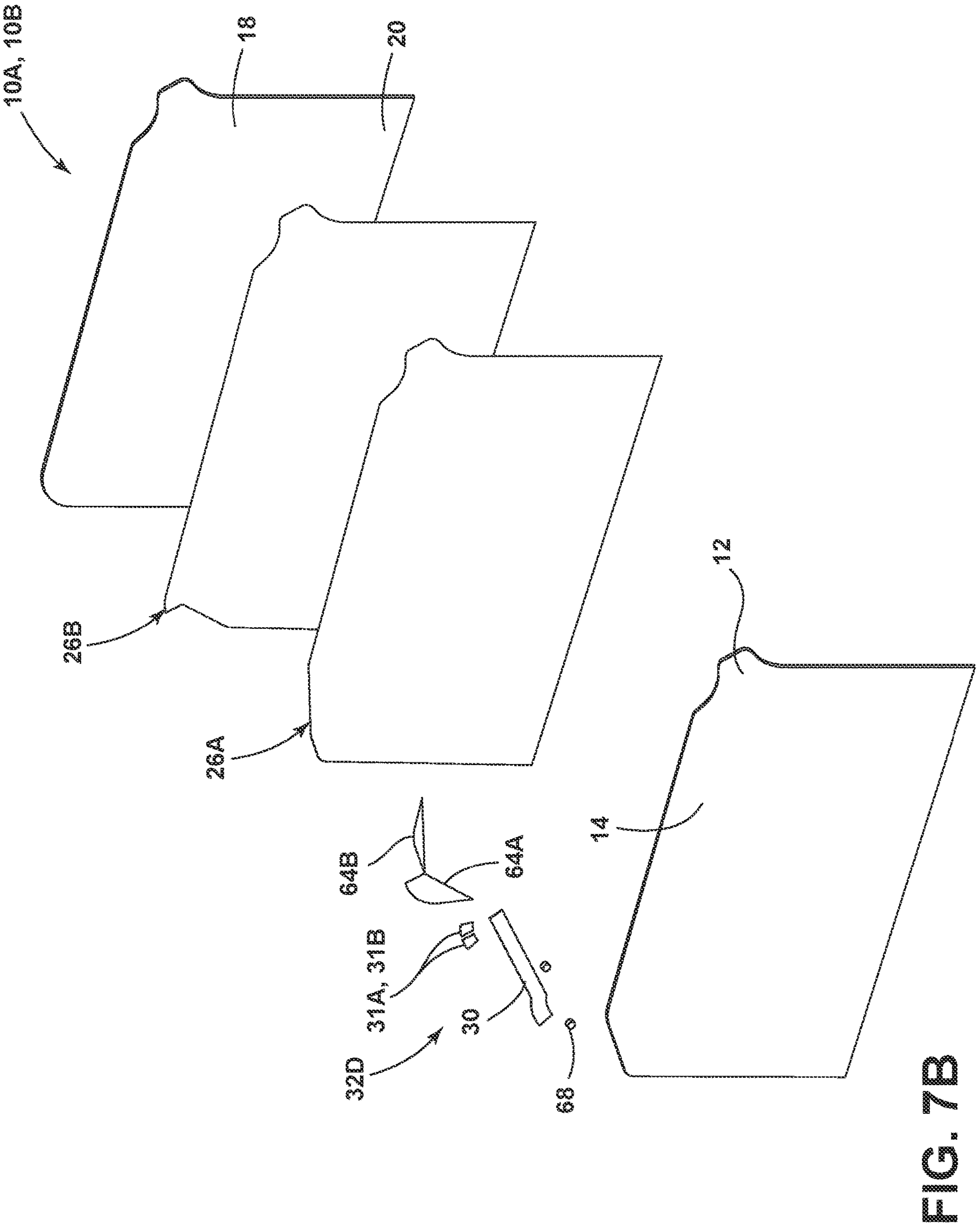
FIG. 7B is a front perspective view of an electro-optic device in a disassembled condition with a conductor assembly and a fourth connection system in accordance with the present disclosure.
Figure 7D:
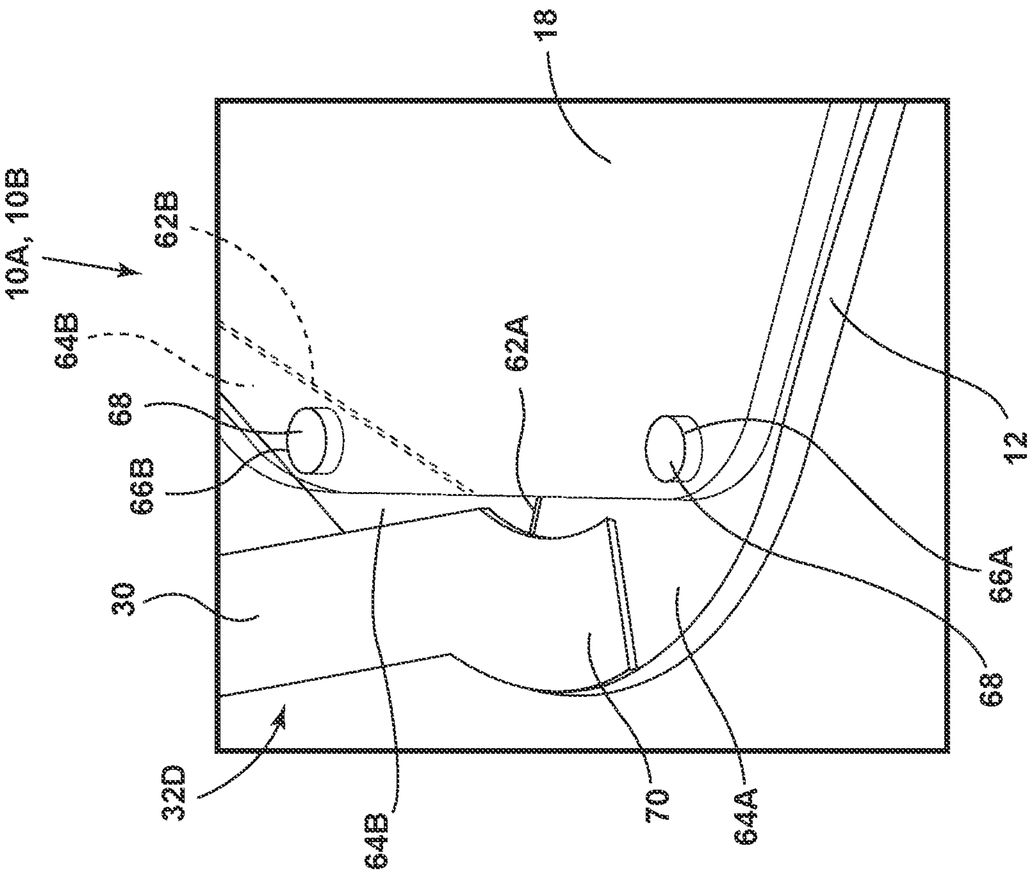
FIG. 7D is a perspective view of an electro-optic assembly and a fourth connection system in accordance with the present disclosure.
Figure 7C:
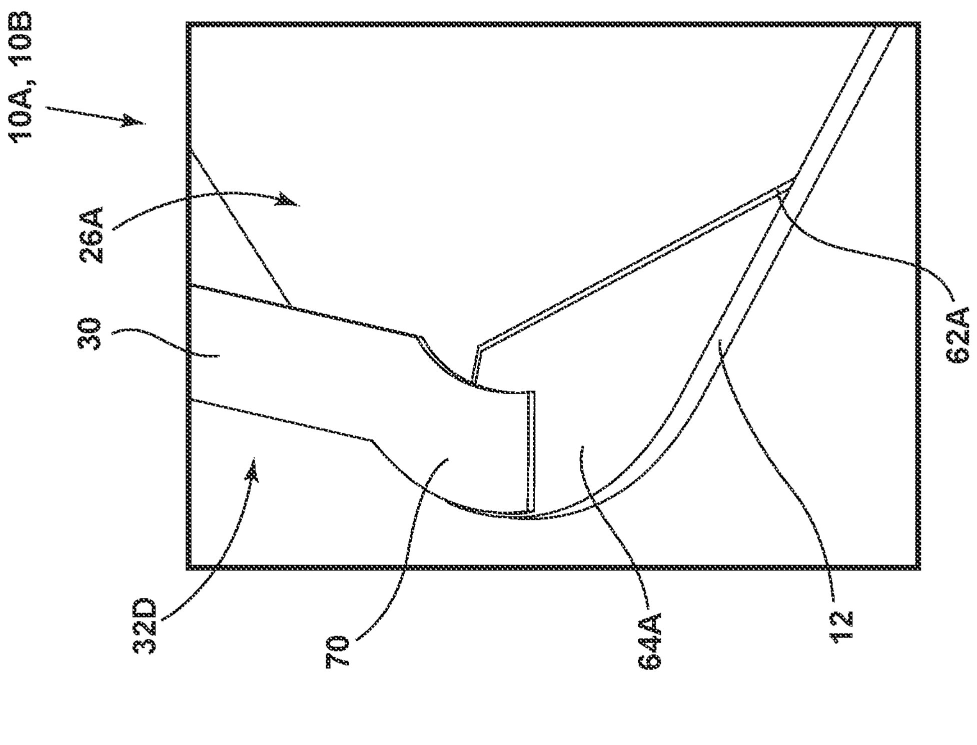
FIG. 7C is a perspective view of a partially disassembled electro-optic assembly and a fourth connection system in accordance with the present disclosure.

With reference now to FIGS. 5A-5B, the second connection system 32B is illustrated. The second connection system 32B may be electrically coupled to the electro-optic assemblies 10A, 10B of either construction, incorporated into any of the structures 42A-42D, and utilize the variations of the conductor assembly 30 and conductive intermediaries as described above. Unless otherwise indicated, the second connection system 32B may share all of the same features, dimensions, materials, and components as the other connection systems 32A, 32C-32E. More particularly, the second connection system 32B includes a first conductive intermediary 50 and a second conductive intermediary 52, such as those described above. The first conductive intermediary 50 may be the same or different as the second conductive intermediary 52. More particularly, the first conductive intermediary 50 is configured to adhere (e.g., a conductive adhesive, epoxy, and/or the like) to the conductor assembly 30 (e.g., one of the conduction ports 31A, 31B) in an electrically coupled relationship with one of the electrodes 26A, 26B (e.g., direct contact, via the buses 36A, 36B, or via the conductive wraps 39A, 39B). The second conductive intermediary 52, on the other hand, may be configured to adhere or not adhere but is deposited on the opposite conduction port 31A, 31B after adherence by the first conductive intermediary 50. During assembly, the conductor assembly 30 is adhered via the first conductive intermediary 50 prior to connecting the first and second substrates 12, 18 (e.g., depositing the seal 34). The second conductive intermediary 52 is then deposited after the conductor assembly 30 is adhered via the first conductive intermediary 50 and before or after connecting the first and second substrates 12, 18. The second conductive intermediary 52 may be non-curing or exhibit low durometer characteristics pre- and post-curing to prevent outward pressure between the substrates 12, 18 and facilitate uniform cell spacing. In some embodiments, the second conductive intermediary 52 is curable, but is deposited at a time (e.g., after the seal 34 is deposited) in the assembly process such that the second intermediary 52 cures after or during the same time period that the seal 34 cures.

With reference now to FIGS. 6A-6D, the third connection system 32C is illustrated. The third connection system 32C may be electrically coupled to the electro-optic assemblies 10A, 10B of either construction, incorporated into any of the structures 42A-42D, and utilize the variations of the conductor assembly 30 and conductive intermediaries as described above. Unless otherwise indicated, the third connection system 32C may share all the same features, dimensions, materials, and components as the other connection systems 32A, 32B, 32D, and 32E. More particularly, the third connection system 32C includes an isolation groove 54 in at least one of the first and/or second electrodes 26A, 26B. The isolation groove 54 may be formed by multiple processes including cutting, etching, laser ablating, other types of ablating, and/or otherwise forming. The conductor assembly 30 includes conduction ports 31A, 31B (not shown) on the same side. For example, the first conduction port 31A may be electrically coupled to the first electrode 26A and the second conduction port 31B is electrically coupled to a conductive island portion 56 defined by the isolation groove 54 in the first electrode 26A. A conductive bridge 58 extends from the conductive island portion 56 to the second electrode 26B. The conductive bridge 58 may be formed of a conductive intermediary, such as one or more of the conductive intermediaries described above. In some embodiments, the conductor assembly 30 defines a non-linear end portion 60 that matches a contour of the first and second substrates 12, 18. It should be appreciated that the isolation groove 54 and conductive island portion 56 may be defined by the second electrode 26B and the conductive bridge 58 may extend to the first electrode 26A.

With reference now to FIGS. 7A-7D, the fourth connection system 32D is illustrated. The fourth connection system 32D may be electrically coupled to the electro-optic assemblies 10A, 10B of either construction, incorporated into any of the structures 42A-42D, and utilize the variations of the conductor assembly 30 and conductive intermediaries as described above. Unless otherwise indicated, the fourth connection system 32D may share all the same features, dimensions, materials, and components as the other connection systems 32A-24C and 32E. More particularly, the fourth connection system 32D includes a pair of isolation grooves 62A, 62B with a first isolation groove 62A in the first electrode 26A and a second isolation groove 62B in the second electrode 26B. The isolation grooves 62A, 62B may be formed by multiple processes including cutting, etching, laser ablating, other types of ablating, and/or otherwise forming. The first isolation groove 62A may define a first conductive island portion 64A in the first electrode 26A and the second isolation groove 62B may define a second conductive island portion 64B in the second electrode 26B that may be utilized to prevent shorting during placement of the conductive intermediary 48. The conductor assembly 30 may include conduction ports 31A, 31B on the same side. The first conduction port 31A is electrically coupled to the first conductive island portion 64A and the second conduction port 31B is electrically coupled to the second conductive island portion 64B. A pair of vias 66A, 66B are formed in one of the first and second substrates 12, 18 and aligned with the conduction ports 31A, 31B. A conductive bridge 68 may then be inserted into the vias 66A, 66B to electrically couple the conductor assembly 30 to each of the first and second electrodes 26A, 26B, respectively. The conductive bridge 68 may be formed of a conductive intermediary, such as one or more of the conductive intermediaries described above. In some embodiments, the conductor assembly 30 defines a non-linear end portion 70 that matches a contour of the first and second substrates 12, 18. It should be appreciated that the third connection system 32C may utilize vias in addition to the fourth connection system 32D. It should also be appreciated that the fourth connection system 32D may only include the first via 66A, the first conductive island portion 64A, and the first isolation groove 62A, where the second conductive port 31B connects directly to the second electrode 26B or first electrode 26A.

Figure 8B:
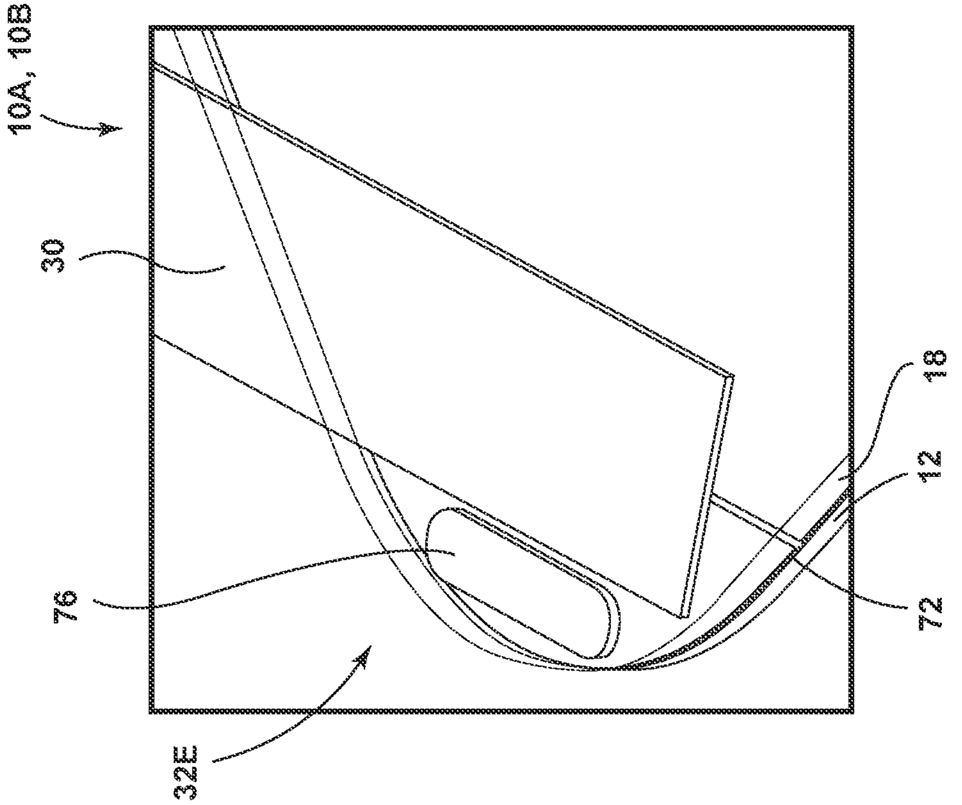
FIG. 8B is a perspective view of an electro-optic assembly and a fifth connection system in accordance with the present disclosure.
Figure 8A:
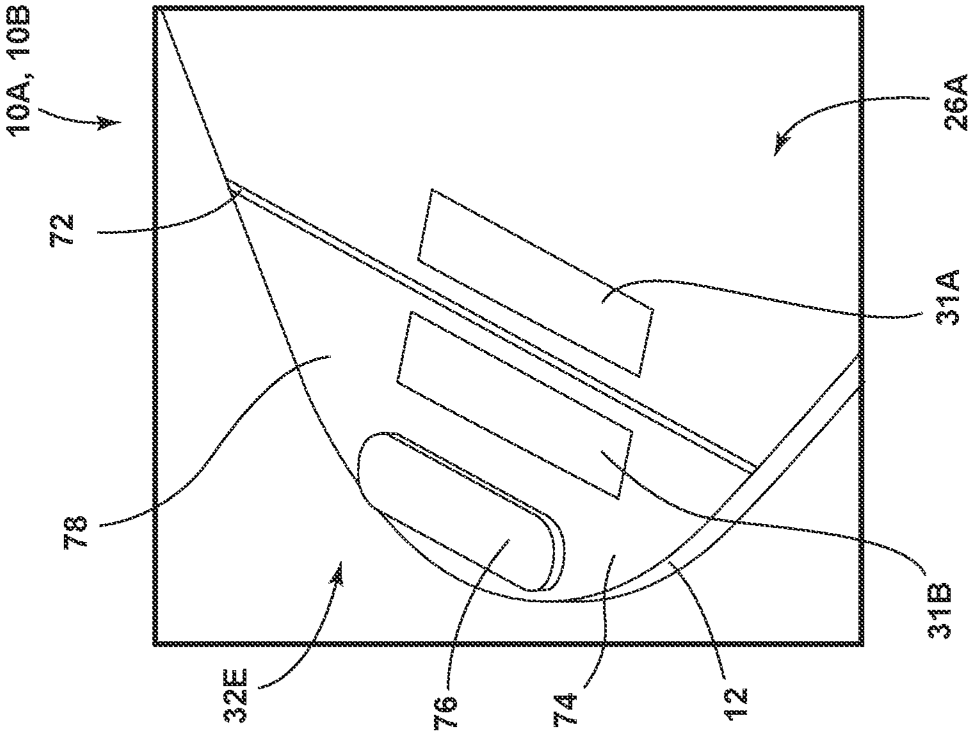
FIG. 8A is a perspective view of an electro-optic assembly in a partially disassembled condition and a fifth connection system in accordance with the present disclosure.

With reference now to FIGS. 8A and 8B, the fifth connection system 32E is illustrated. The fifth connection system 32E may be electrically coupled to the electro-optic assemblies 10A, 10B of either construction, incorporated into any of the structures 42A-42D, and utilize the variations of the conductor assembly 30 and conductive intermediaries as described above. Unless otherwise indicated, the fifth connection system 32E may share all the same features, dimensions, materials, and components as the other connection systems 32A-24D. More particularly, the fifth connection system 32E includes an isolation groove 72 in at least one of the first and/or second electrodes 26A, 26B. The isolation groove 54 may be formed by multiple processes including cutting, etching, laser ablating, other types of ablating, and/or otherwise forming. The conductor assembly 30 includes conduction ports 31A, 31B on the same side that may be spaced width-wise along the conductor assembly 30. For example, the first conduction port 31A may be electrically coupled to the first electrode 26A and the second conduction port 31B may be electrically coupled to a conductive island portion 74 defined by the isolation groove 72 in the first electrode 26A. A conductive bridge 76 extends from the conductive island portion 74 to the second electrode 26B. The conductive bridge 76 may be formed of a conductive intermediary, such as one or more of the conductive intermediaries described above. It should be appreciated that the isolation groove 72 and conductive island portion 74 may be defined by the second electrode 26B and the conductive bridge 76 may extend to the first electrode 26A. In some embodiments, the conductive island portion 74 is primarily formed on a tab 78 extending in an outboard direction from the seal 34.

Figure 9:
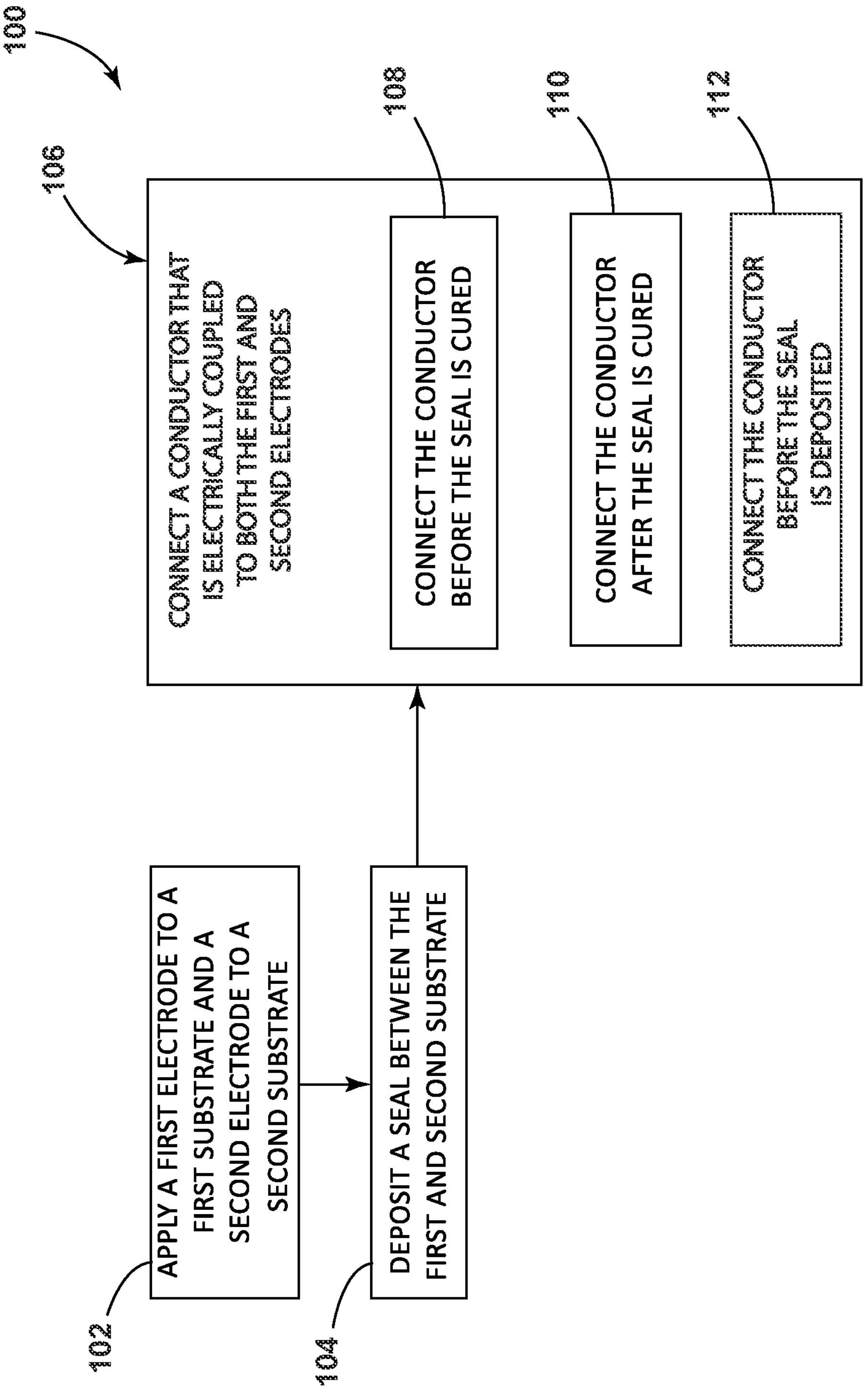
FIG. 9 is a flow chart illustrating a method of connecting a conductor assembly to an electro-optic assembly in accordance with the present disclosure.

With reference now to FIG. 9, a method 100 of forming an electro-optic assembly is illustrated. At 102, the method 100 includes applying a first electrode to a first substrate and a second electrode to a second substrate. Step 102 may include forming one or more isolation lines in one or both of the first and second electrodes. At 104, the method 100 includes depositing a seal between the first and second substrates. At 106, the method 100 includes, connecting a conductor assembly that is electrically coupled to one or both the first and second electrodes (e.g., directly or via the conduction distributor). Step 106 may include connecting the connector as part of a connection system, such as the connection systems 32A-32E and associated steps previously described. Step 106 may include, at 108, connecting the conductor assembly before the seal is cured (e.g., after the seal is deposited). Step 106 may, alternatively, include, at step 110, connecting the conductor assembly after the seal is cured (i.e., after the seal is deposited). Step 112 may, alternatively, include, at step 112, connecting the conductor assembly before the seal is deposited. For example, in some embodiments, the conductor assembly may be connected to one electrode before the seal is deposited or cured, whereafter a conductive intermediary may be used to electrically couple the conductor assembly to the other electrode after the seal has been deposited or cured.

With reference now to FIGS. 1-9, when activated, the electro-optic assembly 10A, 10B exhibits greater distortion outside of the seal than inside of the seal 34, in an area near an electrical contact within about 5 mm. Distortion in electro-optic devices can be a result of a mismatch of material thermal expansion when comparing the primary seal and the area outside of the primary seal which includes the contact. If the primary seal is cured above room temperature and the conductive epoxy also is cured in the same operation, when the part cools to room temperature, there will be residual stress associated with the area of contact which may shrink at a rate different from that of the primary seal. More particularly, when this distortion is detectable inside of the primary seal, the perceived quality of the electro-optic device is reduced. Therefore, the conductor assembly 30 and conductive intermediaries as described herein may be configured to physically bridge the space between the two substrates 12, 18 in an area outside of the seal 34. More particularly, the optical distortion inboard of the seal 34 may be reduced or eliminated by curing the contact material (e.g., conductive intermediary) after the seal 34 has cured and the spacing has been set. In this manner, although there may be stress and optical distortion outside of the seal 34, the seal 34 will be a barrier to this distortion in the inboard direction such that distortion inside of the seal 34 is greatly reduced or eliminated.

The disclosure herein is further summarized in the following paragraphs and is further characterized by combinations of any and all of the various aspects described therein.

According to one aspect of the present disclosure, an electro-optic assembly includes a front substrate that has a first surface and a second surface opposite the first surface. A second substrate has a third surface and a fourth surface opposite the third surface. The second and third surfaces face each other to define a gap with a cell spacing. A first electrode is coupled to the second surface, and a second electrode is coupled to the third surface. An electro-optic medium is located between the first electrode and the second electrode. A conductor assembly is electrically coupled to the first electrode and defines at least one space containing a first conductive intermediary. A seal retains the electro-optic medium in the gap.

According to another aspect, a first and second substrates define a thickness of 0.4 mm or less.

According to yet another aspect, a seal forms a distortion barrier and a cell spacing exhibits greater distortion on an outboard side of the seal than an inboard side of the seal, in the area within about 5 mm of a conductor assembly.

According to still yet another aspect, a conductor assembly is configured to continuously bridge between a first and a second electrode.

According to another aspect, a conductor assembly includes at least one pair of projections that define at least one space.

According to yet another aspect, at least one pair of projections includes a first pair of projections and a second pair of projections defining a first space and a second space, a first conductive intermediary is located in the first space and a second conductive intermediary is located in the second space.

According to still yet another aspect, at least one pair of projections is part of an overcoat layer substantially encasing a conductor assembly.

According to another aspect, a first conductive intermediary comprises a conductive adhesive or a paste bonding a conductor assembly to at least one of a first or a second electrode.

According to yet another aspect, a first conductive intermediary comprises a material exhibiting lower durometer characteristics than a seal.

According to still yet another aspect, a conductor assembly extends at least partially between a first substrate and a second substrate.

According to another aspect, a conductor assembly includes the first conductive intermediary and a second conductive intermediary that are coupled to one of a first conductive wrap or a first bus and a second conductive wrap or a second bus, respectively.

According to yet another aspect, a first conductive wrap extends at least partially along an outer perimeter of a first substrate and at least partially around a second surface.

According to another aspect of the present disclosure, an electro-optic assembly includes a front substrate that has a first surface and a second surface opposite the first surface. A second substrate has a third surface and a fourth surface opposite the third surface.

The second and third surfaces face each other to define a gap with a cell spacing. A first electrode is coupled to the second surface, and a second electrode is coupled to the third surface. At least one of the first and second electrodes includes an at least one isolation line defining at least one conductive island. An electro-optic medium is located between the first electrode and the second electrode and configured to activate between transmission states. A conductor assembly is electrically coupled to the first electrode and the second electrode and includes at least one conductive bridge that electrically couples the at least one conductive island to the first and second electrodes opposite the at least one of the first and second electrodes that includes the at least one isolation line.

According to another aspect, at least one conductive bridge is located in a via defined by a first or second substrate.

According to yet another aspect, a conductive bridge comprises at least one of a conductive paste, an epoxy, a foam, a tape, an adhesive, an ink, and solder.

According to still yet another aspect, at least one isolation line includes a first isolation line and a second isolation line and at least one conductive island includes a first conductive island and a second conductive island.

According to another aspect, a conductor assembly extends at least partially between a first substrate and a second substrate.

According to yet another aspect, a conductor assembly defines a non-linear end portion that matches a contour of at least one of a first and a second substrate.

According to still yet another aspect, an isolation line in one of a first and a second electrode defines a conductive island portion on an outwardly extending tab and a conductive bridge electrically couples a conductive island portion to an opposite one of the first and second electrodes.

According to yet another aspect of the present disclosure, an electro-optic assembly includes a front substrate that has a first surface and a second surface opposite the first surface. A second substrate has a third surface and a fourth surface opposite the third surface. The second and third surfaces face each other to define a gap with a cell spacing. A first electrode is coupled to the second surface, and a second electrode is coupled to the third surface. An electro-optic medium is located between the first electrode and the second electrode. A conductor assembly includes a first conduction path that is adhered to one of the first electrodes with a first conductive intermediary and a second conduction path that is coupled to the other of the first and second electrodes with a second conductive intermediary. A seal retains the electro-optic medium in the gap.

According to another aspect, a first conductive intermediary is formed of a conductive adhesive and a second conductive intermediary is formed of a conductive material exhibiting durometer characteristics lower than a seal.

According to still yet another aspect of the present disclosure, an electro-optic assembly includes a first and second substrates are 0.4 mm thick or less and, when activated, the electro-optic assembly exhibits greater distortion outside of a seal than inside a seal, in an area near an electrical contact within about 5 mm.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term “coupled” (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term “about” means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term “about” is used in describing a value or an end-point of a range, the disclosure should be understood to include the specific value or end-point referred to. Whether or not a numerical value or end-point of a range in the specification recites “about,” the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An electro-optic assembly, comprising:

a front substrate having a first surface and a second surface opposite the first surface;

a second substrate having a third surface and a fourth surface opposite the third surface, the second and third surfaces facing each other to define a gap with a cell spacing;

a first electrode coupled to the second surface;

a second electrode coupled to the third surface;

an electro-optic medium located between the first electrode and the second electrode and configured to activate between transmission states;

a conductor assembly electrically coupled to the first electrode and including at least one pair of projections extending within the gap and defining at least one space within the gap containing a first conductive intermediary; and a seal retaining the electro-optic medium in the gap.

2. The electro-optic assembly of claim 1, wherein the first and second substrates define a thickness of 0.4 mm or less.

3. The electro-optic assembly of claim 1, wherein the seal forms a distortion barrier and the cell spacing exhibits greater distortion on an outboard side of the seal than an inboard side of the seal, in the area within about 5 mm of the conductor assembly.

4. The electro-optic assembly of claim 1, wherein the conductor assembly is configured to continuously bridge between the first and second electrodes.

5. The electro-optic assembly of claim 1, wherein the at least one pair of projections include at least one of ridges, posts, or ribs.

6. The electro-optic assembly of claim 1, wherein the at least one pair of projections includes a first pair of projections and a second pair of projections defining a first space and a second space, the first conductive intermediary located in the first space and a second conductive intermediary located in the second space.

7. The electro-optic assembly of claim 1, wherein the at least one pair of projections is part of an overcoat layer substantially encasing the conductor assembly.

8. The electro-optic assembly of claim 1, wherein the first conductive intermediary comprises a conductive adhesive or a paste bonding the conductor assembly to at least one of the first or second electrodes.

9. The electro-optic assembly of claim 8, wherein the first conductive intermediary comprises a material exhibiting lower durometer characteristics than the seal.

10. The electro-optic assembly of claim 1, wherein the conductor assembly extends at least partially between the first substrate and the second substrate.

11. The electro-optic assembly of claim 1, wherein the conductor assembly includes the first conductive intermediary and a second conductive intermediary that are coupled to one of a first conductive wrap or a first bus and a second conductive wrap or a second bus, respectively.

12. The electro-optic assembly of claim 11, wherein the first conductive wrap extends at least partially along an outer perimeter of the first substrate and at least partially around the second surface.

13. An electro-optic assembly, comprising:

a front substrate having a first surface and a second surface opposite the first surface;

a second substrate having a third surface and a fourth surface opposite the third surface, the second and third surfaces facing each other to define a gap with a cell spacing;

a first electrode coupled to the second surface and a second electrode coupled to the third surface, at least one of the first and second electrodes includes an at least one isolation line defining at least one conductive island;

an electro-optic medium located between the first electrode and the second electrode and configured to activate between transmission states; and a conductor assembly electrically coupled to the first electrode and the second electrode and including at least one conductive bridge that electrically couples the at least one conductive island to the first and second electrodes opposite the at least one of the first and second electrodes that includes the at least one isolation line.

14. The electro-optic assembly of claim 13, wherein the at least one conductive bridge is located in a via defined by the first or second substrate.

15. The electro-optic assembly of claim 13, wherein the at least one isolation line includes a first isolation line and a second isolation line and the at least one conductive island includes a first conductive island and a second conductive island.

16. The electro-optic assembly of claim 13, wherein the conductor assembly extends at least partially between the first substrate and the second substrate.

17. The electro-optic assembly of claim 13, wherein the conductor assembly defines a non-linear end portion that matches a contour of at least one of the first and second substrates.

18. The electro-optic assembly of claim 13, wherein the isolation line in one of the first and second electrodes defines a conductive island portion on an outwardly extending tab and a conductive bridge electrically couples the conductive island portion to an opposite one of the first and second electrodes.

19. An electro-optic assembly, comprising:

a front substrate having a first surface and a second surface opposite the first surface;

a second substrate having a third surface and a fourth surface opposite the third surface, the second and third surfaces facing each other to define a gap with a cell spacing;

a first electrode coupled to the second surface;

a second electrode coupled to the third surface;

an electro-optic medium located between the first electrode and the second electrode and configured to activate between transmission states;

a conductor assembly includes a first conduction path that is adhered to the first electrode with a first conductive intermediary coupled to a first conductive wrap extending at least partially along an outer perimeter of the first substrate and at least partially around the second surface and a second conduction path that is coupled to the second electrode with a second conductive intermediary coupled to a second conductive wrap; and a seal retaining the electro-optic medium in the gap.

20. The electro-optic assembly of claim 19, wherein the first conductive intermediary is formed of a conductive adhesive and the second conductive intermediary is formed of a conductive material exhibiting durometer characteristics lower than the seal.

* * * * *